March 18, 1958    A. J. ROSENBERGER    2,826,917
MOUNTING FOR INDICATING INSTRUMENTS
Filed Feb. 1, 1954
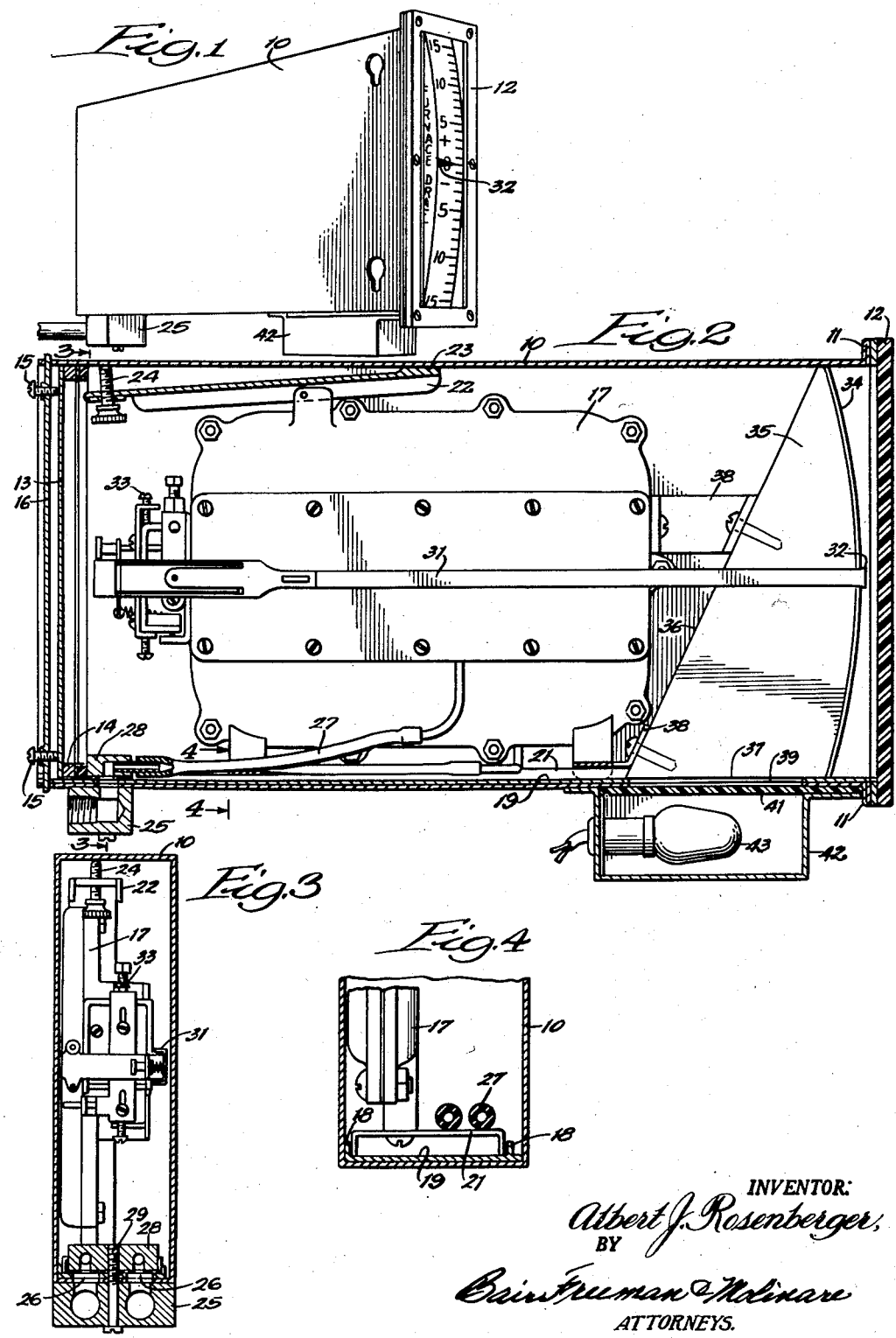
INVENTOR:
Albert J. Rosenberger,
BY
ATTORNEYS.

United States Patent Office 2,826,917
Patented Mar. 18, 1958

2,826,917

MOUNTING FOR INDICATING INSTRUMENTS

Albert J. Rosenberger, Chicago, Ill., assignor, by mesne assignments, to Republic Flow Meters Company, Chicago, Ill., a corporation of Delaware Application February 1, 1954, Serial No. 407,464

4 Claims. (Cl. 73—431)

This invention relates to a mounting for an indicating instrument and more particularly to the mounting of pressure responsive indicating instruments in panel supported housings.

In conventional panel mounted instruments it is common practice to enclose a complete sensitive instrument in a housing and to secure the housing to a panel in registry with an opening in the panel. For repair or major adjustments of the instrument mechanism, it is necessary to remove the housing from the panel and then to remove the instrument from the housing for adequate access to the instrument parts. Furthermore, instruments of this type, as heretofore constructed, have been relatively bulky and require large panels and a large amount of space around the panels for installation and removal of the instruments.

In an effort to reduce panel sizes resort has been had to the use of remote transmitting instruments connected to relatively small panel mounted receivers. Such installations are expensive and are subject to the delay and inaccuracies incident to the use of telemetering systems between the sensitive instrument and the receiver.

It is one of the objects of the present invention to provide a mounting for indicating instruments in which a small compact instrument is mounted in a compact housing permanently or semi-permanently mounted on a panel.

Another object is to provide a mounting in which the instrument mechanism can be easily and quickly installed in and removed from the housing without disturbing the mounting of the housing on the panel.

According to one feature of the invention, the instrument body can be slid into the housing from either its front or its rear end and will be securely held in place in the housing by simple and easily adjustable securing means.

Still another object is to provide a mounting in which fluid pressure connections to the instrument are easily and quickly made by a connecting block secured to the interior of the housing and communicating with ports therein.

A further object ist to provide a mounting in which a pointer is pivoted at one end in the instrument body and an arcuate scale is carried by the other end of the body over which the pointer moves so that a scale of maximum size and minimum curvature may be employed.

A still further object is to provide an instrument in which the scale is carried by a piece of translucent material mounted on the instrument body and illuminated by a light source outside of the housing.

The above and other objects and features of the invention will be more readily apparent from the following description when read in connection with the accompanying drawing, in which:

Figure 1 is a perspective view of an instrument mounting embodying the invention;

Figure 2 is a longitudinal vertical section showing the instrument in elevation;

Figure 3 is a section on the line 3—3 of Figure 2; and

Figure 4 is a partial section on the line 4—4 of Figure 2.

The instrument mounting, as shown, comprises a longitudinal casing indicated generally at 10 formed with a flange 11 at its front open end which is adapted to be secured to a panel in registry with an opening therein. It will be understood that the housing can be rigidly mounted on the panel by any desired type of fastening means which may be permanent or semi-permanent in character. It will further be understood that the housing may be made of any desired size to receive one or more instrument mechanisms even though in the illustrated construction only one instrument is mounted in the housing.

The housing, as shown, is open at both its front and rear ends and may be closed at its front by a transparent panel 12 formed of glass, plastic, or the like, which is secured to the front flange 11 of the housing. At its rear end, the housing may be closed by a plate 13 fitting against a sealing ring 14 secured in the housing. The plate may fit into the end of the housing and may be pressed against the sealing ring by screws 15 threaded into a bar 16 whose ends project through reduced openings adjacent the end of the housing.

The housing is adapted to receive an indicating instrument shown as a differential pressure responsive draft gauge. The instrument comprises a relatively flat generally rectangular body 17 which, as seen in Figures 3 and 4, is formed by two halves secured together around their periphery so that a pressure sensitive diaphragm may be clamped between them. The body is adapted to be mounted vertically in the casing 10 with its edges supported on the upper and lower sides of the casing and with its front end visible through the transparent plate 12. To position the instrument body in the casing, the casing is provided at its lower side with upwardly extending track members 18 which may be formed in the casing itself or in a support plate or strip 19 positioned in the casing bottom. The lower edge of the instrument body carries a pair of spaced foot members 21 formed with downwardly turned flanges to fit between the tracks 18 so that the instrument will be guided to a desired position within the casing and can be slid into or out of the casing through either end thereof. With single units, as illustrated, the sides of the casing 10 may serve as the guide tracks, if desired, but in multiple units the provision of separate track elements, such as 18, is necessary to position the several units in proper side by side relationship in the casing.

To hold the instrument securely in the casing after it has been slid to the proper position therein, means are provided at the opposite ends of the instrument body to press against the opposite side of the casing. As shown, this means comprises a lever 22 pivoted intermediate its ends on the upper edge of the instrument body. The forward end of the lever terminates in a pad 23 to press against the upper side of the casing and the rear end of the lever carries a screw 24 which is adjustable to vary the pressure against the casing. To insert or remove the instrument, the screw 24 is threaded downward through the lever at which time the lever will clear the upper side of the casing so that the instrument can be slid easily into or out of the casing. When the screw is threaded through the lever it will engage the upper side of the casing and rock the lever in a direction to press the pad 23 against the upper side of the casing. The pressure exerted by this pad and the screw 24 will hold the instrument body securely in the casing against any possibility of accidental movement. It will be noted that the screw 24 is easily accessible through the rear end of the casing so that the instrument can be very easily mounted or dismounted.

Pressure is supplied to the diaphragm in the instrument body through external connections which lead into a block 25 secured to the outer bottom side of the casing near the rear end thereof. The block is provided with passages terminating with ports 26 in the lower wall of the casing, as best seen in Figures 2 and 3. To connect the ports 26 to the instrument body, flexible tubes 27 are provided secured to the instrument body on opposite sides of the diaphragm therein and which are connected at their rear ends to a pressure block 28. The pressure block 28 is formed with passages therein terminating at the flat lower surface of the block in ports adapted to register with the ports 26. To complete the fluid connections to the instrument, the block 28 is positioned over the ports 26 with a suitable sealing gasket therebetween and is drawn down against the bottom side of the casing by a fastening such as screw 29. In this way, the pressure connections to the instrument can be made easily and quickly and can be disconnected easily and quickly when the instrument is to be removed.

To indicate values sensed by the diaphragm or other sensing devices in the instrument body, an elongated pointer 31 is provided pivoted on a horizontal axis at the rear end of the instrument body and projecting forwardly along one side of the instrument body to terminate in an inwardly turned point 32, as best seen in Figure 1. The pointer 31 may be connected to the diaphragm or other sensitive element in the instrument body through a linkage indicated generally at 33 and which may be constructed as more particularly described and claimed in my co-pending application, Serial No. 411,765, filed Feb. 23, 1954, to provide for zero setting and calibrating adjustments of the pointer.

The pointer 32 is adapted to move over an arcuately curved scale 34 carried by the front end of the instrument body immediately behind the cover plate 12. The scale 34 may be a curved strip of translucent plastic material which is mounted on the curved front face of a translucent or transparent block 35 formed of glass, clear plastic, or the like. The block 35 is of generally triangular shape with an arcuately curved front face lying immediately behind the cover plate 12 with a straight rear face 36 lying at an acute angle to the front face and with a flat base 37 lying adjacent and parallel to the bottom side of the housing. The block may be rigidly secured to the front end of the instrument body through brackets 38 so that the block will always be accurately positioned with respect to the instrument and so that the accuracy of the instrument will be unaffected by any variations in mounting of the instrument in its housing. Preferably the rear face 36 of the block is roughened for light diffusion, as will be apparent hereinafter.

To illuminate the dial, the bottom side of the housing adjacent its front end is formed with an opening 39 which may be closed by a transparent cover 41. A light housing 42 is secured to the bottom side of the casing 10 over the opening 39 and may carry one or more sources of light, such as bulbs 43. For a multiple housing, it will be understood that individual bulbs might be provided for each instrument or that a single elongated bulb or tube could be employed to illuminate all of the instruments. When the bulb 33 is lighted, the light therefrom will pass through the transparent cover 41 into the base 37 of the translucent block 35. Light will be reflected from and be diffused by the roughened rear surface 36 and block to illuminate the dial 34 from the rear side thereof. Where different characteristic colors are desired for different dials in an instrument installation, the dials 34 themselves may be tinted or tinted transparent sheets of the desired colors may be mounted between the dials and the respective blocks 35 so that when the dials are lighted they will possess the desired color.

It will be seen that with the present invention instruments of extremely small compact size and which constitute complete indicating instruments may easily be mounted in individual or multiple housings and may easily be removed therefrom as desired for repair or replacement. When the instruments are mounted or removed, the only connections which need be disturbed are the pressure connections thereto which can be done quickly and easily. Since the dials are carried solely by the instrument bodies extremely accurate mounting of the instruments in their housings is not required and since the dials are constructed to be illuminated by outside sources, no adjustments or connections are necessary to establish or disconnect the illuminating means when the instruments are moved.

While one embodiment of the invention has been shown and described in detail herein, it will be understood that this is illustrative only and is not to be taken as a definition of the scope of the invention, reference being had for this purpose to the appended claims.

What is claimed is:

1. A mounting for an indicating instrument comprising a housing having spaced parallel sides at least one of which is formed with spaced parallel guide tracks, a flat instrument body fitting edgewise between the sides, foot members on one edge of the body engaging and guided by the tracks on one of the sides to guide the instrument body during sliding thereof into and out of the housing, adjustable compression means carried by the opposite edge of the body and engageable with the other of the sides to press the body between the sides thereby to hold it in the housing and means to adjust the compression means to secure the body in the housing or to release it therefrom.

2. A mounting for an indicating instrument comprising a housing having spaced parallel sides at least one of which is formed with spaced parallel guide tracks, a flat instrument body fitting edgewise between the sides, foot members on one edge of the body engaging and guided by the tracks on one of the sides to guide the instrument body during sliding thereof into and out of the housing, a lever pivoted intermediate its ends on the other edge of the body, and a screw threaded into one end of the lever to engage the other side of the housing and press the other end of the lever against the other side of the housing.

3. A mounting for an indicating instrument comprising a hollow housing of rectangular section open at its ends, a flat instrument body fitting edgewise between opposite sides of the housing and adapted to be slid into the housing from one of its ends, foot members on one edge of the body engaging one side of the housing, adjustable means carried by the other edge of the body to press against the opposite side of the housing thereby to hold the body in the housing and means to adjust the compression means to secure the body in the housing or to release it therefrom.

4. A mounting for an indicating instrument comprising a hollow housing of rectangular section open at its ends, a flat instrument body fitting edgewise between opposite sides of the housing and adapted to be slid into the housing from one of its ends, foot members on one edge of the body engaging one side of the housing, raised guide tracks on said one side of the housing between which the foot members fit to guide the body in the housing, a lever pivoted intermediate its ends on the other edge of the body, and a screw threaded through one end of the lever to engage the other side of the housing and press the other end of the lever against the other side of the housing.

(References on following page)

References Cited in the file of this patent

UNITED STATES PATENTS

| | | |
|---|---|---|
| 2,124,072 | Luckey et al. | July 19, 1938 |
| 2,142,338 | Sidwell | Jan. 3, 1939 |
| 2,340,395 | Lindemann | Feb. 1, 1944 |
| 2,352,881 | Avigdor | July 4, 1944 |
| 2,561,885 | Prideaux et al. | July 24, 1951 |

FOREIGN PATENTS

| | | |
|---|---|---|
| 597,644 | Great Britain | Jan. 30, 1948 |
| 616,098 | Great Britain | Jan. 17, 1949 |
| 554,906 | Great Britain | July 23, 1943 |
| 587,479 | Great Britain | Apr. 28, 1947 |

OTHER REFERENCES

Bulletin 2M48, Hagan Corp., Hagan Bldg., Pittsburgh 30, Pa. Received in the Patent Office Sept. 15, 1948, 3 relied on.